United States Patent
Wlodarczyk et al.

(10) Patent No.: US 9,247,593 B2
(45) Date of Patent: Jan. 26, 2016

(54) THREE-PHASE POWER SUPPLY AND SYSTEM OF LEDS WITH THREE-PHASE POWER SUPPLY

(71) Applicant: MILOO-ELECTRONICS Sp. z o.o., Nowy Wisnicz (PL)

(72) Inventors: Milosz Wlodarczyk, Bochnia (PL); Lukasz Kolaszewski, Warsaw (PL); Rafal Brzegowy, Krolowka (PL)

(73) Assignee: MILOO-ELECTRONICS Sp. z o.o., Nowy Wisnicz (PL)

( * ) Notice: Subject to any disclaimer, the term of this patent is extended or adjusted under 35 U.S.C. 154(b) by 0 days.

(21) Appl. No.: 14/466,968

(22) Filed: Aug. 23, 2014

(65) Prior Publication Data
US 2015/0054408 A1    Feb. 26, 2015

(30) Foreign Application Priority Data
Aug. 23, 2013    (PL) .......................................... 405128

(51) Int. Cl.
H05B 33/08    (2006.01)
H02M 7/219    (2006.01)
H02M 1/36    (2007.01)
H02M 1/00    (2007.01)

(52) U.S. Cl.
CPC ............. H05B 33/0809 (2013.01); H02M 1/36 (2013.01); H02M 7/219 (2013.01); H05B 33/083 (2013.01); H02M 2001/0048 (2013.01); H02M 2007/2195 (2013.01)

(58) Field of Classification Search
CPC .. H05B 33/08; H05B 33/0809; H05B 33/083; H02M 2001/0048; H02M 7/219; H02M 2007/2195; H02M 5/4585

USPC ......... 315/137, 145, 147, 224, 291, 307, 308; 363/36, 37, 52, 84, 89, 97, 8, 131, 132
See application file for complete search history.

(56) References Cited

U.S. PATENT DOCUMENTS

| 8,686,651 | B2 * | 4/2014 | Lynch | H05B 33/0818 315/192 |
|---|---|---|---|---|
| 2010/0164409 | A1 | 7/2010 | Lo et al. | |
| 2013/0148389 | A1 * | 6/2013 | Tanaka | H02M 5/458 363/37 |
| 2013/0181646 | A1 * | 7/2013 | Takata | H02M 1/12 318/400.29 |
| 2013/0193897 | A1 * | 8/2013 | Iwashita | H02P 27/085 318/503 |

FOREIGN PATENT DOCUMENTS

| WO | 2011014450 A1 | 2/2011 |
| WO | 2012142495 A1 | 10/2012 |
| WO | 2013011422 A1 | 1/2013 |

* cited by examiner

Primary Examiner — Thai Pham
(74) Attorney, Agent, or Firm — Andrew Malarz

(57) ABSTRACT

A three-phase power supply (10), intended especially to supply LEDs system (20), has a system of a diode bridge rectifier which comprises rectifying diodes (101, 102, 103, 104, 105, 106). The three-phase power supply (10) is additionally equipped with FETs and each of the rectifying diodes is bypassed by an FET of a rectifying unit (111, 112, 113, 114, 115, 116), respectively, which is controlled by a control system (40), comprising an analog-to-digital converter ADC 403, a digital-to-analog converter (402), a microcontroller (401), which provides a control signal to a gate of the appropriate FET through the input/output (404). Once the control system (40), in particular the microcontroller (401), detects stable power supply conditions and starts operation of elements of an LED sequencer (30), it starts at the same time to control over the FETs in the active rectifier.

12 Claims, 12 Drawing Sheets

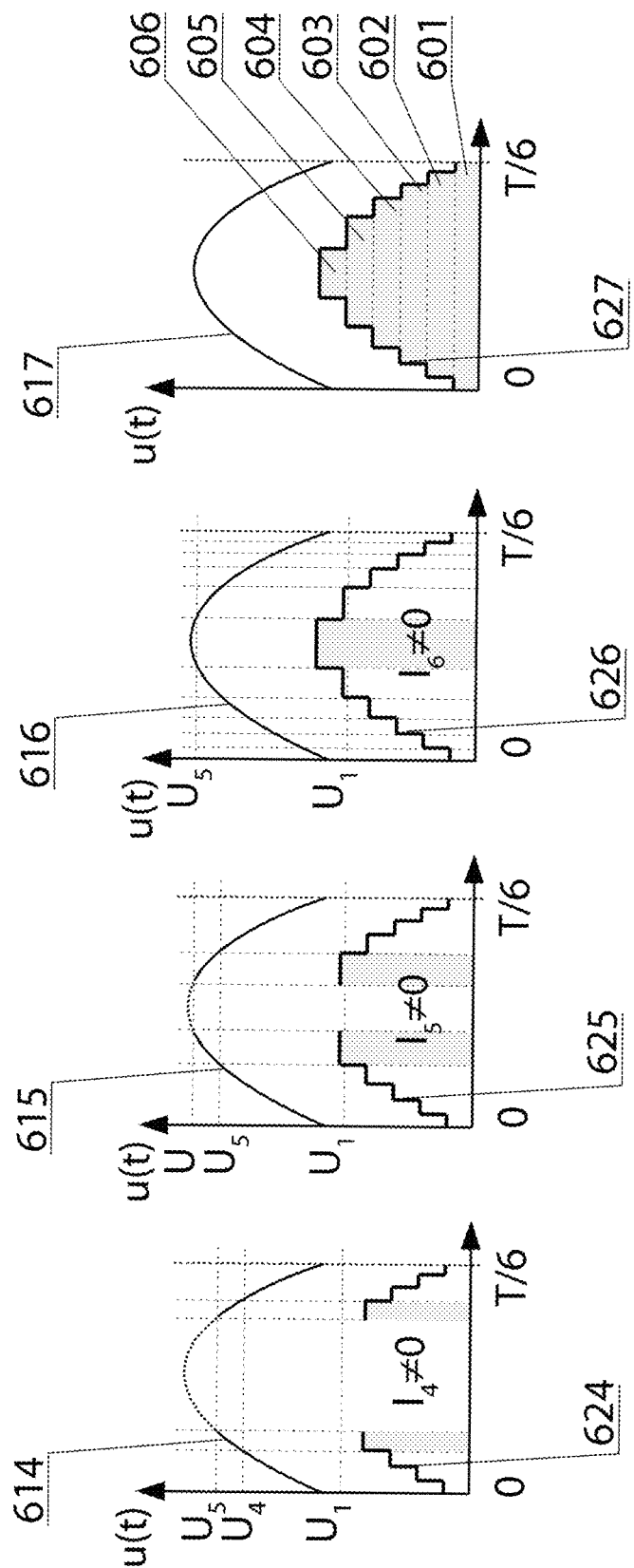

THREE-PHASE POWER SUPPLY AND SYSTEM OF LEDS WITH THREE-PHASE POWER SUPPLY

CROSS-REFERENCE TO RELATED APPLICATIONS

Pursuant to 35 U.S.C 119 and the Paris Convention Treaty this application claims the benefit of Polish Patent Application No. P405128 filed on Aug. 23, 2013, the contents of which are incorporated herein by reference.

BACKGROUND OF THE INVENTION

1. Field of the Invention

Technical concept presented herein relates to a three-phase power supply and a system of light emitting diodes (LEDs) with the three-phase power supply, especially a system of LEDs for illuminating devices.

2. Description of the Related Art

The growing demand for energy, including electric energy, forces the use of new cost-effective solutions, including in the area of illuminating rooms, which are characterised by low power loss and high luminous efficiency, and the most well-known of these use LEDs, whose luminous efficiency exceeds even 100 lm/W, as a light source.

International application WO 2011014450 A titled "Three-phase led power supply" discloses a three-phase rectifier, supplying LEDs system.

Application US 2010164409 A1 titled "Integrally formed light emitting diode light wire and uses thereof" discloses LEDs wire having LEDs modules consisting of 3 number of LEDs and a microprocessor with pods, which control the operation of the LEDs.

Moreover, international application WO 2012142495 A1 titled "Multiple stage sequential current regulator" discloses a controller tor LEDs circuits to control a number of LEDs segments supplied by a rectified AC source. Each of the control elements das two ends, one and of which is connected to the rectified AC source, and the other and is connected to other ends of each segment of LEDs connected in series.

International application WO 2013011422 A1 titled "Light source comprising an LED strip" discloses an elongated board with LEDs, which is supplied by a DC source and comprises connected together parallel LEDs systems, connected in series.

Application US 20130181646 A1 tided "Three-phase AC to DC converter and air conditioning apparatus using three-phase AC to DC converter" discloses a three-phase AC to DC convener having a three-phase AC power supply, a three-phase rectifier bridge circuit that is connected to the three-phase AC power supply and includes rectifying devices which are connected in a bridge configuration, a three-phase full-bridge circuit that includes two serially-connected switching devices for each of three phases, the two serially-connected switching devices being connected at an output side of the three-phase rectifier bridge circuit, and includes reverse blocking diodes which are connected in parallel to the respective switching devices. Furthermore, the three-phase AC to DC converter has a reactor that connects the three-phase full-bridge circuit to the three-phase AC power supply, a smoothing capacitor connected to an output side of the three-phase full-bridge circuit, DC voltage detection means that detects an output voltage, power supply phase detection means that detects a power supply phase of the three-phase AC power supply, and pulse width modulator that outputs PWM signals which control the switching devices.

A disadvantage of the known solutions is a problem with losses of power converted into heat which must be discharged outside LEDs systems and a susceptibility to overvoltage of fluorescent lamp electrical system.

SUMMARY OF THE INVENTION

It is an object of the present invention to provide a three-phase power supply and a system of high emitting diodes (LEDs), thanks to which losses of power converted into host will be lower as compared to known power supplies.

This objective is achieved by a three-phase power supply comprising a full-wave rectifier, having two diodes connected in series for each phase connected at a node or connection point, to which a wire voltage line is connected, wherein a cathode of one of two diodes connected at a node or a connection point is connected to the –U pole of the power supply system intended to supply an electronic device, especially to supply a system of LEDs connected in segments, and an anode of a second of the two diodes connected at the connection point is connected to the –U pole of the power supply system of an electronic device equipped with a control arrangement. To save electrical energy each diode of the full-wave rectifier is connected in parallel with a field-effect transistor (PET) conductive in the same direction as the diode shunted with it.

Preferably, the gate of each FET is connected to a separate control output of the microcontroller switching on the FET once a certain voltage at the gate of the FET is reached.

The idea of the invention also LEDs system with a three-phase power supply comprising a full-wave rectifier, having one node or connection point of two diodes connected in series for each phase, to which a wire voltage line is connected, wherein a cathode of one of two diodes connected at the connection point is connected to the positive pole of the power supply system of the LEDs system, and an anode of a second of the two diodes connected at the connection point is connected to the negative pole of the power supply system of the LEDs system, wherein the LED system comprises at least two segments of LEDs connected in series, connected with one and of the first segment to one of the poles and supplied with a rectified current by the full-wave rectifier and a control arrangement and to each connection point which connects two adjacent segments of LEDs is connected with its first and to a switching system, whose second and is connected to the second pole and activated by a control arrangement controlled by voltage rectified by the full-wave rectifier. Each diode of the full-wave rectifier is connected in parallel with an FET conductive in the same direction as the diode shunted with it.

A zero segment of LEDs can be connected between an LEDs system comprising at least two segments of LEDs and one of the poles.

Preferably, the LEDs segments and the zero LEDs segment comprise at least one LED or the system of at least two diodes connected in parallel and/or in segments and the LEDs segments are arranged on a PCB with electrical circuits, systems and electronic components.

Preferably, metal shielding layers forming a screen with electronic systems and components between them and/or at least one inner layer with electrical circuits connecting electronic systems and components with the LEDs segments and a system protecting against damages caused by electrostatic discharges (ESD) are placed on the PCB.

To one of the metal shielding layers can be connected the main parallel RC system, which is connected to one of the poles of the power supply of the board with electrical circuits, systems and electronic components, and to another metal shielding layer can be connected an additional parallel RC system, which is connected with the remaining pole or the board power supply system.

Preferably, one of the metal shielding layers of the board with electric circuits, systems and electronic components is a bottom metal shielding layer, which is insulated from a contact surface of a housing or its structural elements.

BRIEF DESCRIPTION OF THE DRAWINGS

This and other objects as well as advantageous features of the technical concept presented herein are accomplished in accordance with the principles of the presented technical concept by providing a three-phase power supply and a system of light emitting diodes. Further details and features of the three-phase power supply and the system of light emitting diodes, their nature and various advantages will become more apparent from the accompanying drawings and the following detailed description of the preferred embodiments shown in a drawing, in which:

FIG. 11A-11H show waveforms of a supply voltage and waveforms of an instantaneous current.

DETAILED DESCRIPTION OF EMBODIMENTS

Figure 1:
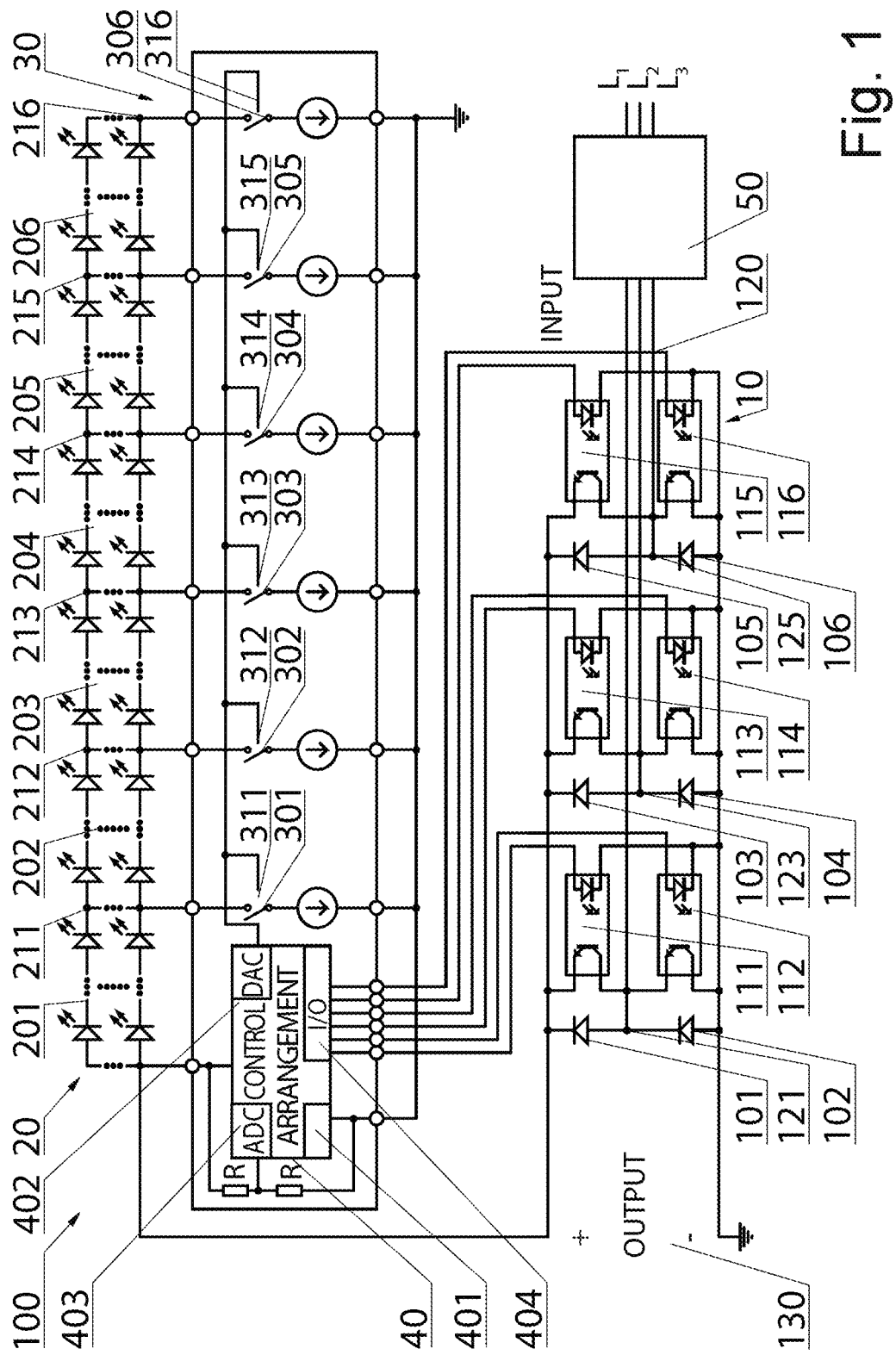
FIG. 1 shows schematically a three-phase power-supply, especially for supplying LEDs system.
Figure 2:
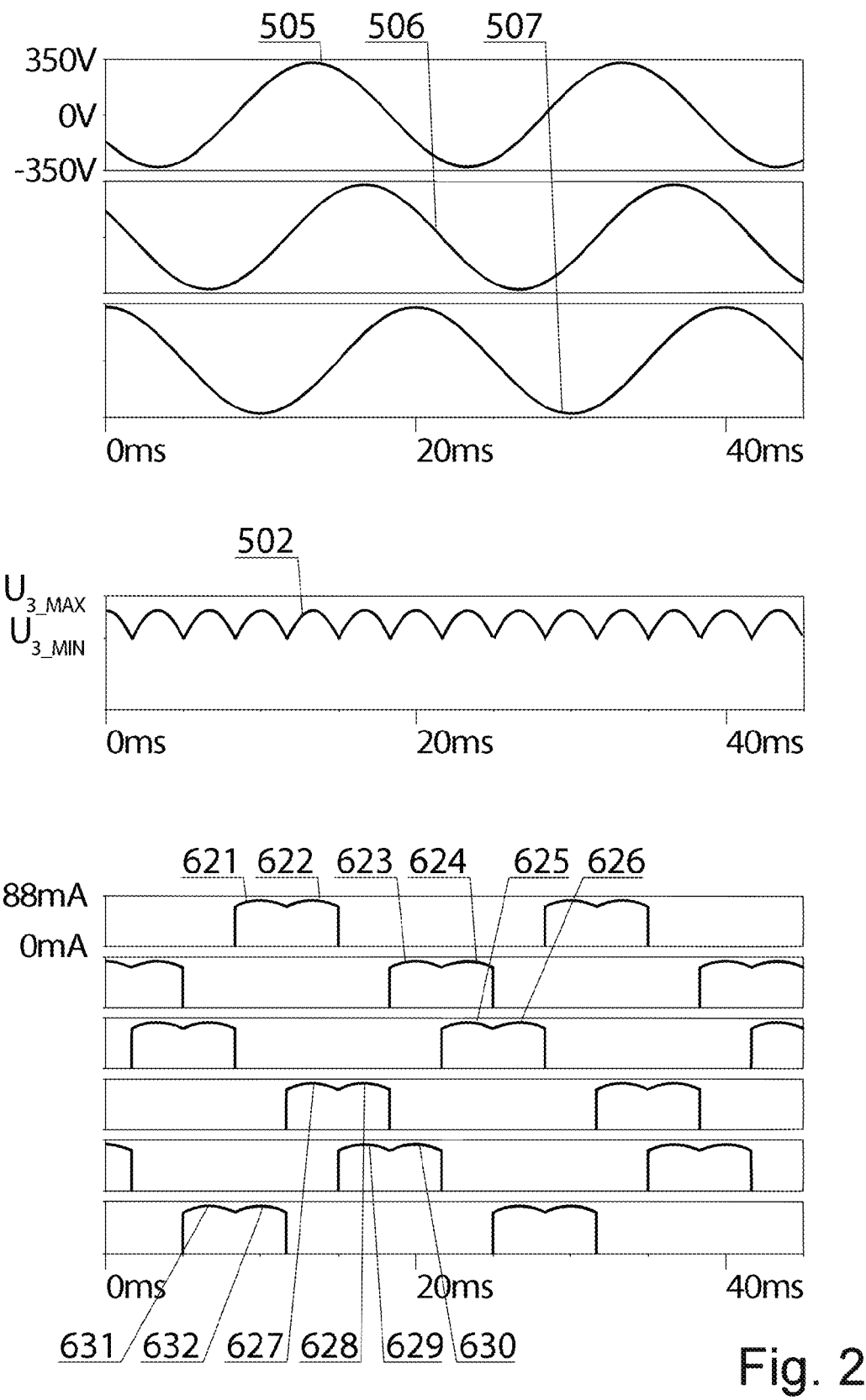
FIG. 2 shows waveforms of a voltage on the respective power lines, a waveform of the voltage over time at an output of a six half-wave rectifier and currents waveforms of FETs.

A three-phase power supply 10 or power supply system with an input 120 and an output 130 being a part of an electrical system 100, presented in FIG. 1 and intended especially to supply LEDs system 20, is a system of a diode six half-wave rectifier which comprises rectifier diodes 101, 102, 103, 104, 105, 106. If a linear LED sequencer is used to build a high-power lighting system, for example over 1 kW, power losses in a passive rectifying diode can achieve significant values in the embodiment shown in FIG. 1, version of an active diode rectifier additionally equipped with FETs is presented. The six rectifying diodes 101, 102, 103, 104, 105, 106 form three pairs 101 and 102, 103 and 104, 105 and 106 of two rectifying diodes connected in series at a connection point 121, 123, 125. One pair of two rectifying diodes is associated with one phase of the three-phase alternating current (AC) power supply connected to the connection point 121, 123, 125. wherein each cathode of one 101, 103, 105 of the two diodes of the three pairs not connected to the connection point is connected to +U pole of the direct current (DC) power supply system supplying an electronic device and each anode of one 102, 104, 106 of the two diodes of the three pairs not connected to the connection point is connected to −U pole of the DC power supply system supplying the electronic device, in this embodiment, each of the rectifying diodes 101, 102, 103, 104, 105, 106 is bypassed or shunted with one of elements of a rectifying unit 111, 112, 113, 114, 115, 116, respectively, especially having a light emitting diode (LED) and one field-effect transistor (FET) bypassing each of the rectifying diodes 101, 102, 103, 104, 105, 106, and having a gate activated by the LED of the rectifying unit, which is controlled, i.e. switched on and off by means of a control arrangement 40, comprising an analogue-to-digital converter ADC 403, a digital-to-analogue converter DAC 402, a microcontroller 401, which provides a control signal to a gate of the appropriate FET through the input/output (Input/Output, I/O in short) 404. The FETs used in the three-phase power supply can be p-type channel or n-type. In the first period after switching on the power supply, only passive elements in a bridge rectifier, which are rectifier diodes 101, 102, 103, 104, 105, 106, are working. Once the control arrangement 40, in particular the microcontroller 401, detects stable power supply conditions and starts operation of elements of an LED sequencer 30, it starts at the same time control over the FETs of rectifying units 111, 112, 113, 114, 115, 116 in the active rectifier. The FETs of rectifying units 111, 112, 113, 114, 115, 116 are switched on when a specified voltage at the gate of a specified FET of rectifying units 111, 112, 113, 114, 115, 116 is obtained and serve as a shunting switch in the bridge rectifier. Thanks to the shunting of the rectifier diodes, the resistance of the system, comprising the rectifier diode and the FET, decreases. The switches based on the system of the FET of rectifying units 111, 112, 113, 114, 115, 116 and the LEDs are switched on according to the sequence shown in FIG. 2, which shows charts 505, 506, 507 of the wire power supply voltage for each of three phases $L_1$, $L_2$ and $L_3$ at the top and then shows a chart 502 of the voltage at the rectifier output in the middle, and then shows waveforms of currents from 621 to 632 in each of the switches at the bottom. Horizontal axes x have the same scale to show a dependence over time in a more visible way. At the time when the current in a given switch is non-zero, the voltage controlling this switch has a high value, and the switch is switched on at a voltage $U_{3\_min}$, because the value of the control voltage is suitable to correctly switch on the given switch. At a given time, two complementary switches locking the power supply circuit are always switched on. The switches are switched on in the following pairs: 111 and 114, which is presented in charts 621 and 632, 114 and 115, which is presented in the charts 622 and 627, 115 and 112, which is presented in the charts 626 and 620, 112 and 113, which is presented in the charts 623 and 630, 113 and 116, which is presented in the charts 624 and 625, and 116 and 111, which is presented in charts 626 and 631, shown in FIG. 2. The switches are switched at intervals 10/3=~3.33 ms. Each switching is synchronised with the time of reaching the voltage $U_{3\_min}$ which in a preferred embodiments amounts $\sqrt{3}/2\ U_{max}$. This system allows for the elimination of additional electronic components, in the first period after the power supply is switched on, only passive components in the bridge rectifier, which are the rectifier diodes, operate. However, after starting the system, when the microcontroller detects stable conditions of power supply, synchronises with the waveform of the voltage of the power supply and starts working of LED sequencer components, it starts to control the keys in the active rectifier at the same time. This way of switching on allows for safe activating of the system and minimising losses on the rectifier components. The use of galvanic insulation between actuators, i.e. the FETs of rectifying units 111, 112, 113, 114, 115, 116 and the control system or the control arrangement 40, further increases the reliability of the entire solution.

Figure 4:
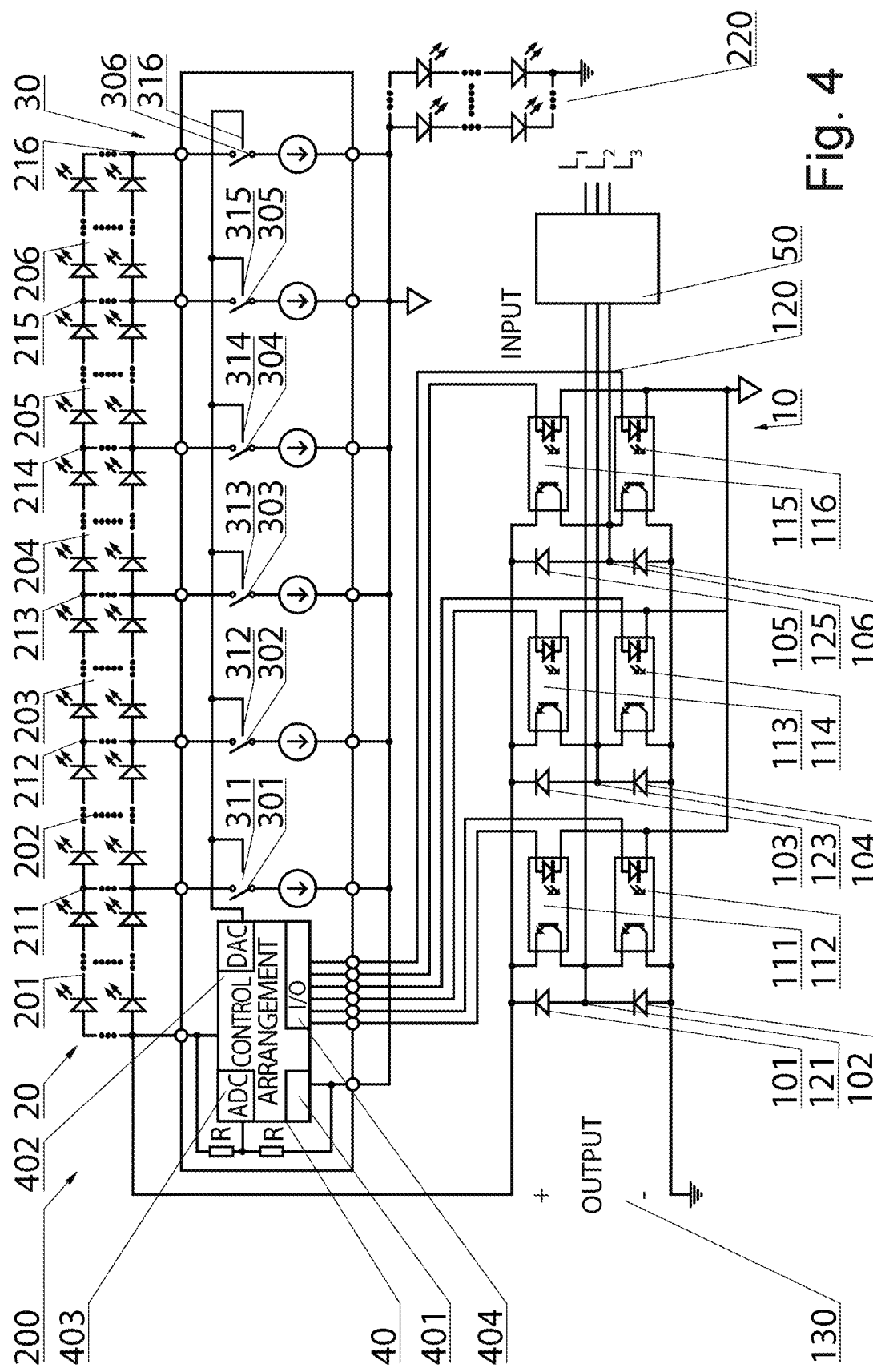
Figure 5:
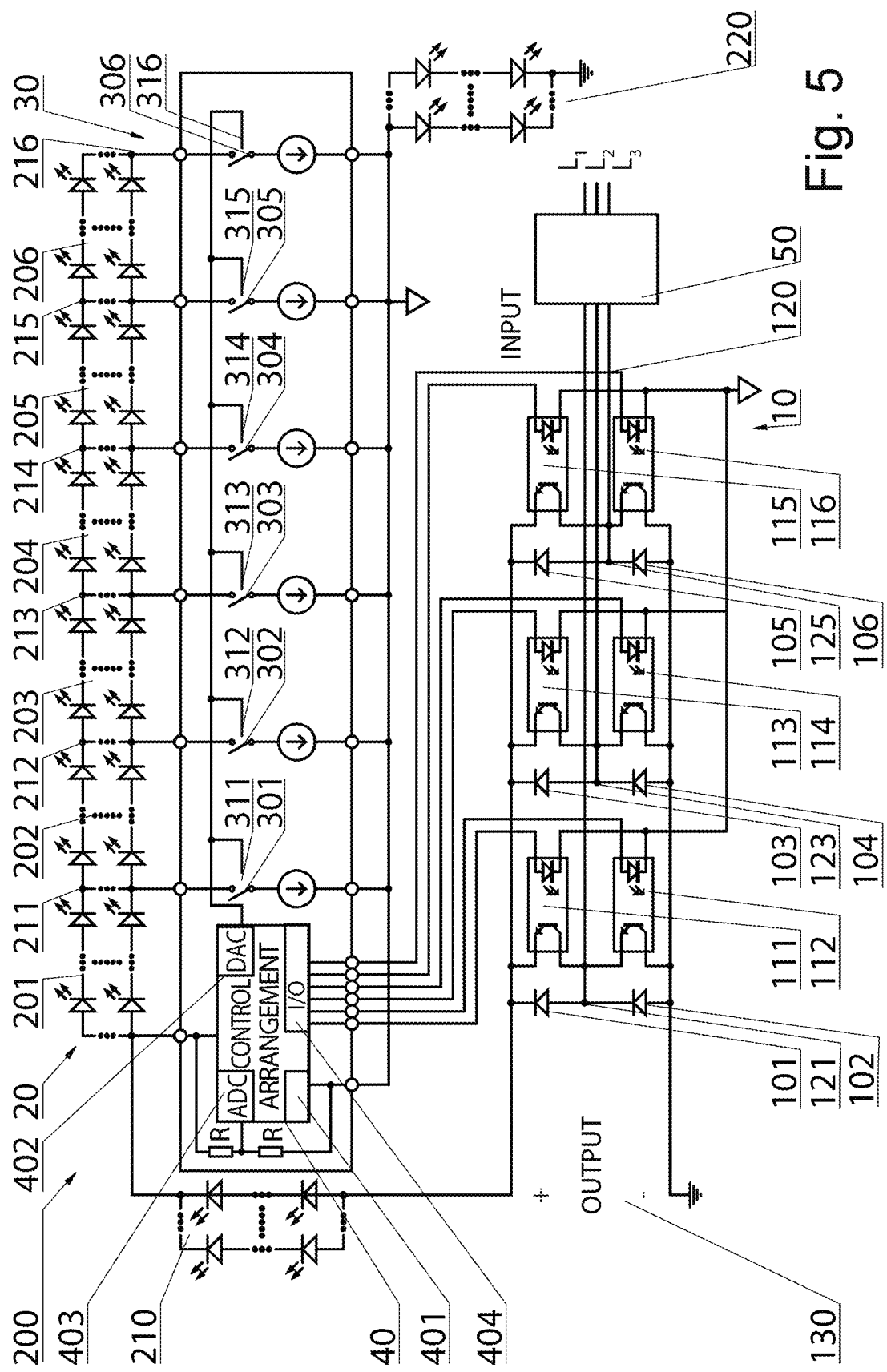
Figure 10:
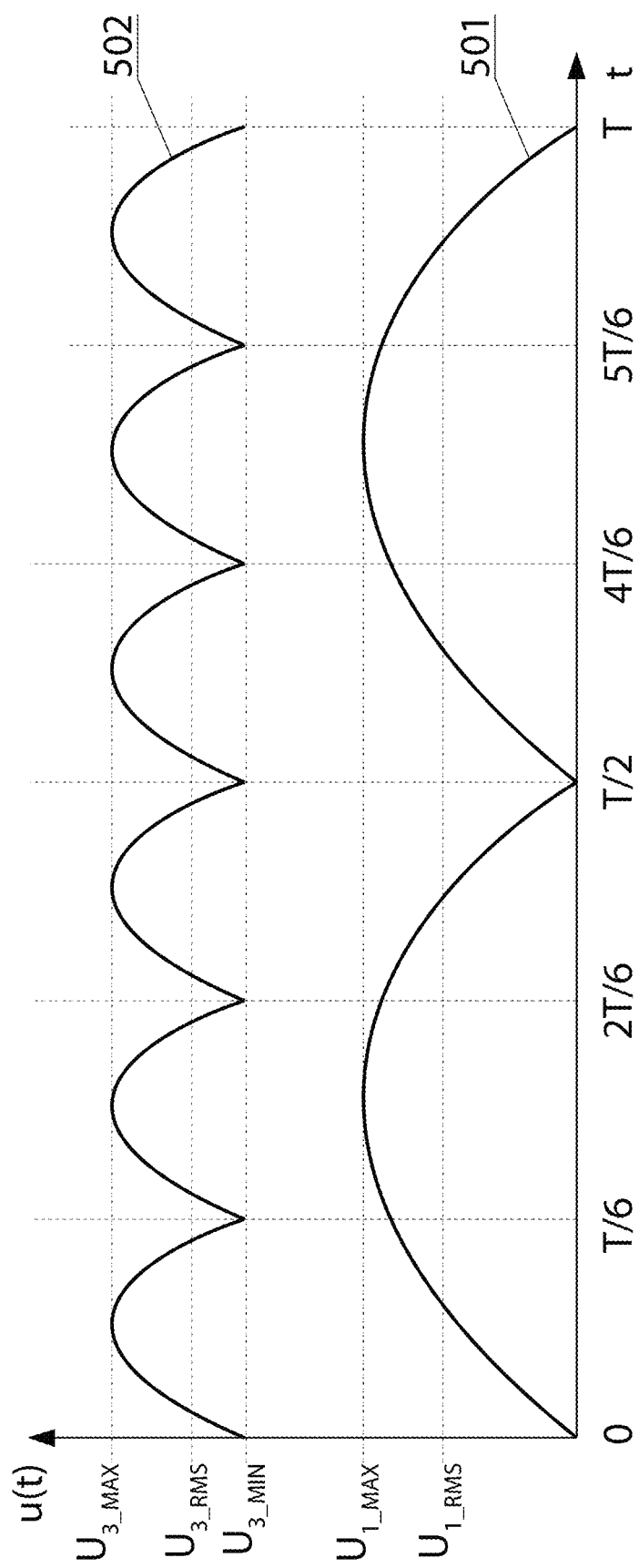
FIG. 10 shows a waveform of a voltage over time at an output of a full-wave rectifier and a waveform of a voltage over time at an output of a six half-wave rectifier.

The three-phase power supply 10, presented in FIG. 1, can work with any electronic device, but in the embodiment shown in FIG. 1, it serves to supply the LEDs system 20, especially segments 201, 202, 203, 204, 205, 206 of the LEDs system for illuminating devices. The switching of exemplary segments 201, 202, 203, 204, 205, 206 of the LEDs system, as discussed in the description of FIG. 11A-11H, and further, if these are connected, is controlled by the control arrangement 40 using control systems 311, 312, 313, 314, 315, 316 of the LED sequencer 30, which activates by a DAG control system 402 switching systems 301, 302, 303, 304, 305, 306 of the LED sequencer 30, whose outputs are connected to successive ends of segments 201, 202, 203, 204, 205, 206 of the LEDs system. The three-phase power supply 10 of FIG. 1 has the input 120, which is connected to the three-phase power supply line by means of a system 50 for correction of a passive power factor. An electrical system 200 with the LEDs system 20 with the three-phase power supply with the input 120 and the output 130 presented in FIG. 3, 4, 5 differs from the electrical system 100 with the LEDs system with the three-phase power supply of FIG. 1 in that the system of FIG. 3 additionally has a passive zero segment 210 of the LEDs situated in front of the segments 201, 202, 203, 204, 205, 206 of the LEDs system, the system of FIG. 4 additionally has a passive zero segment 220 of the LEDs situated behind the segments 201, 302, 203, 204, 205, 206 of the LEDs system, and the system of FIG. 5 additionally has two passive zero segments 210, 220 of the LEDs, situated in front and behind the segments 201, 202, 203, 204, 205, 206 of the LEDs system. The reference numerals indicated in FIGS. 3, 4, 5 correspond to the reference numerals of the same components in FIG. 1. The number of LEDs in this segment is selected so as to put down on them the greatest possible value of the supply voltage. Optimally, the voltage accumulated on the passive zero segment 210, 220 is equal to the minimum instantaneous level of the voltage achieved at the output 130 of the six half-wave rectifier 10, i.e. the voltage $U_{3\_MIN}$ as defined in FIG. 10. This solution allows for minimising the supply voltage of active components, which directly translates into a lower level of power losses.

Figure 6:
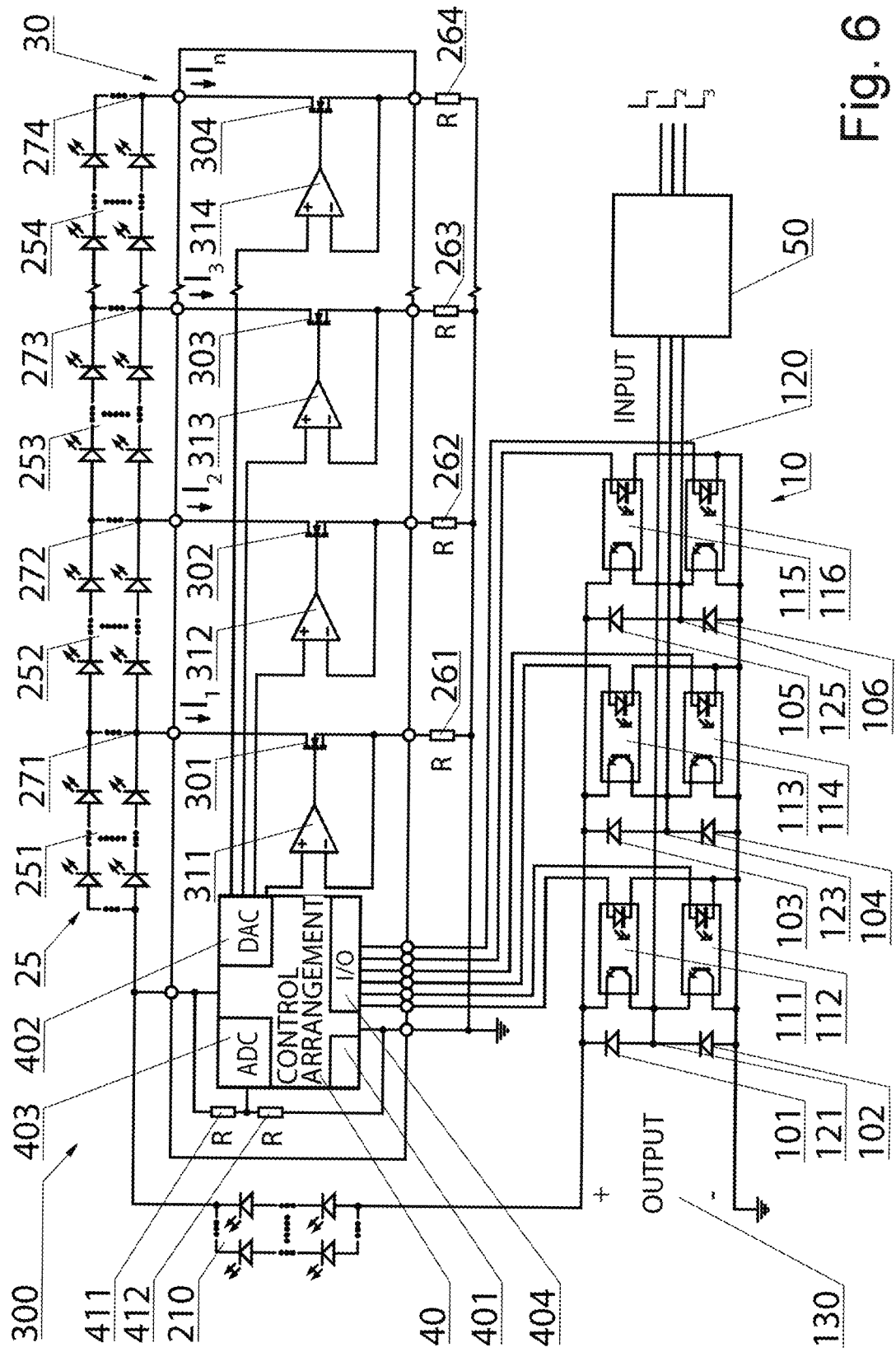
FIG. 6 shows a detailed LEDs system with an LED zero passive segment with a three-phase power supply.
Figure 7:
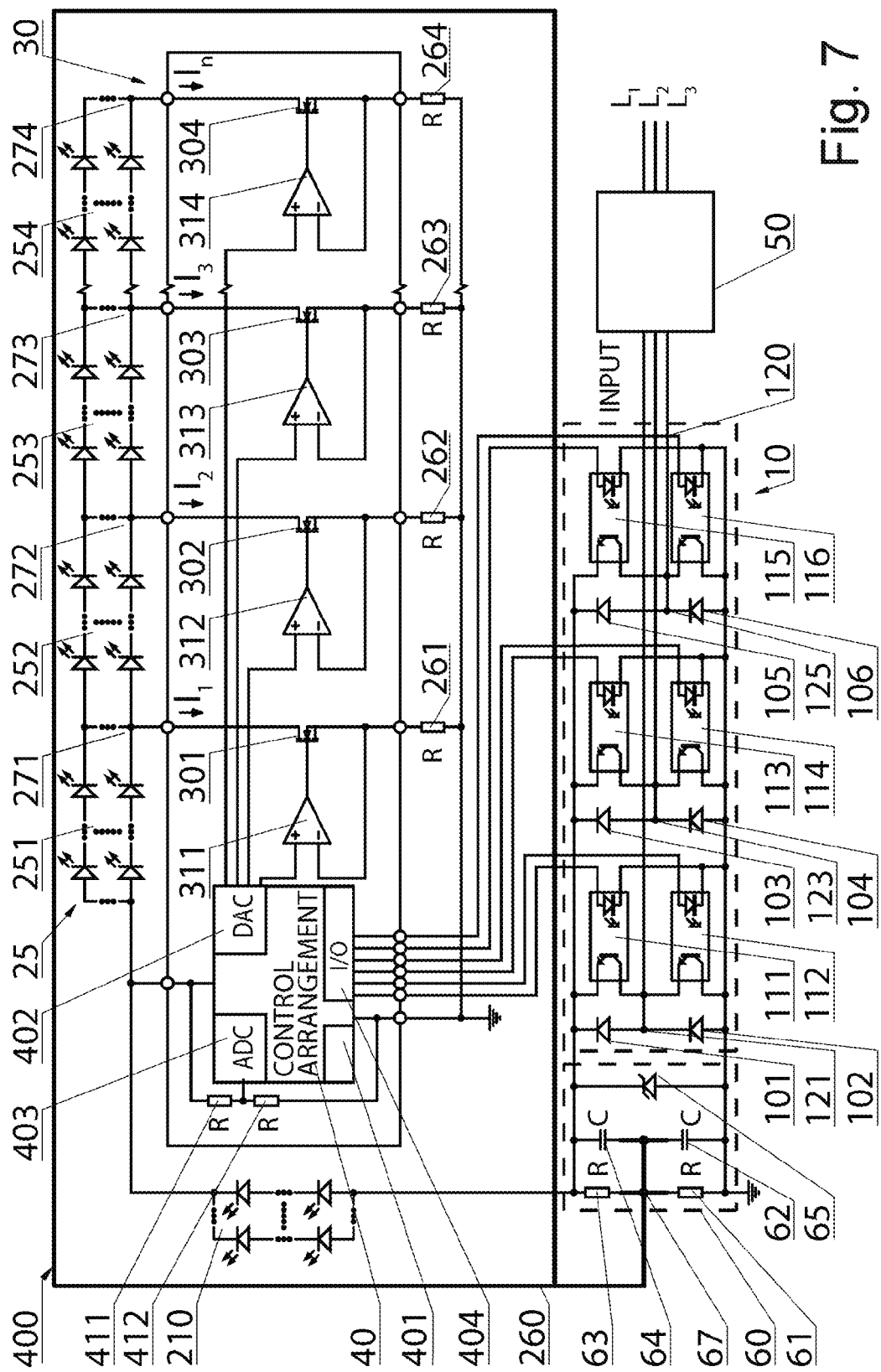
FIG. 7 shows a detailed LEDs system with an LED zero passive segment with a three-phase power supply and with an antistatic system.

FIG. 6 shows a detailed electrical system 300 with LEDs system 25 with the passive zero segment 210 or LEDs and segments 251, 252, 253 with the three-phase power supply 10, with the input I 120 and the output O 130, wherein the n-th segment of the LEDs was marked with a number 254. The main component of the control arrangement 40 controlling the work of the entire electrical system 300 is the microcontroller 401 with built-in Random Access Memory (RAM) memory and Flash Memory (FLASH memory). The non-volatile memory of the microcontroller 401 comprises a program for executing a control algorithm, which is based on reading the instantaneous value of the supply voltage on the line +U using the built-in analogue to digital converter ADC 403 with a cooperating analogue system for voltage matching. The read voltage value is compared to pre-set threshold voltages, and on that basis, a decision concerning the current control of each of the LED segments, i.e. switching of specific switching systems 301, 302, 303, 304, is taken. Current sources, which are systems for stabilising the value of current rating regardless of changes in supply voltage and load conditions, controlling the current in each of the segments, are realized in the classical system with an operational amplifier. Each of the switching systems 301, 302, 303, 304 of the LED sequencer 30, activated using the control systems 311, 312, 313, 314 of the LED sequencer 30 and controlled from an output of the amplifier, serves as a current amplifier. Current Ii supplying segment i 251, 252, 253, 254, from i=1 to i=n, flows through a resistor Ri 261, 262, 263, 264, whose value is of the order 10-100 Ohm at the voltage value $U_{DAC}$ of 0-3.3 V and causes the voltage drop across this resistor. Then Ui is the voltage which is directed to an inverting input of the operational amplifier 311, 312, 313, 314 and is comparable to a reference voltage provided to a non-inverting input from an output of the digital to analogue converter DAC 402. Each of the operational amplifiers 311, 312, 313, 314, by the nature of its function, strives to control an output voltage in such a way that the voltages at the inverting "−" and non-inverting "+" input were equal. In this way, at a fixed resistor value Ri, Ii current can be determined using the following formula: $Ii=U_{OAC}IRi$. The proposed solution in the form of linear current sources with a smoothly adjustable reference voltage allows for very flexible current control in all segments. The current in each segment can be set from zero to a maximum value using a software. No hardware modifications are required. This design of the system allows for the execution of any smooth transitions from switching off one segment to switching on the next segment, in the electrical system 300, the value of resistors R 411, 412 forming a voltage divider is selected to decrease the supply voltage of the maximum value, for example 570 V, to the range of the input dynamics of the ADC converter 403. being equal from 0 V to 3.3 V. for an exemplary value of the divider 1:200 and exemplary values or the resistors R 411, 412, respectively, 200 kOhm and 1 kOhm. An electrical system 400 of FIG. 7 with the LEDs system 25 with the passive zero segment 210 of LEDs and the segments 251, 252, 253 with the three-phase power supply 10 with the input 120 and the output 130, wherein the n-th segment of the LEDs was marked with the number 254, compared to the system 300 of FIG. 8, additionally has a protection circuit or a protection system 60 against electrostatic discharges with a spatial screen 260, wherein the active part of the screen is marked with a bold line, whose paths are extended around ail sensitive to electrostatic discharges components of the electrical system, especially around the linear LED sequencer 30, the LEDs system 25 and the processor of the control arrangement 40, arranged on a PCS. The reference numerals indicated in FIG. 7 correspond to the reference numerals of the same components in FIG. 6. The spatial screen 260 typically has numerous metal shielding layers, which can be connected to each other using electrical connections, also known as grummets, and at least two RC parallel circuits 61, 62 and 63, 64 or dividers $R_{61}/R_{63}$ and $C_{62}/C_{64}$. The number of parallel RC circuits may even be equal to the number of metal shielding layers or higher if the metal shielding layers have large surfaces. Between the metal shielding layers, at least one inner layer with electrical circuits connecting the systems and electronic components may be located. In the solution shown in FIG. 7, one metal shielding layer of a spatial system is connected with the main parallel RC circuit 61, 62, which is connected to one of the −U, +U poles, in this case with the −U pole, of the power supply system 10. Another metal shielding layer is connected with the additional parallel RC circuit 63, 64, which is connected to the other −U, +U pole, in this case with the +U pole, of the power supply system 10. The terms "main" and "additional" may be used interchangeably in relation to the parallel RC circuits, which are the circuits comprising at least one resistor R and at least one capacitor C. Optionally, the system 80 of protection against electrostatic discharges comprises a rectifier system 65, which may be a Zener diode, wherein one of the terminals is connected to one of the −U, +U poles of the power supply system, which is connected for example to the main parallel RC circuit 61, 62. The second terminal of the threshold rectifier system, for example the Zener diode, is connected to the remaining −U, +U pole of the power supply system, which is for example connected to the auxiliary parallel RC circuit 63, 64. The rectifier system 65 in the system 80 of protection against electrostatic discharges is connected in the direction of conducting the electrical current, from the negative pole −U of the board power supply system to the positive pole +U of the board supply system and is used in order to remove the excess of negative charges accumulated on the negative pole −U. The spatial screen 250 is a low-impedance circuit for electrostatic discharge. Thus, all charges and discharges, which will be caught by the spatial protective screen, are short circuited by means of parallel RC circuits and then are discharged to the power supply line +U and −U and/or are reset by the rectifier system 65. In particular by the Zener diode. All components of the electrostatic protection have parameters fitted in a way to withstand standard surge voltages occurring during normal use.

Figure 8:
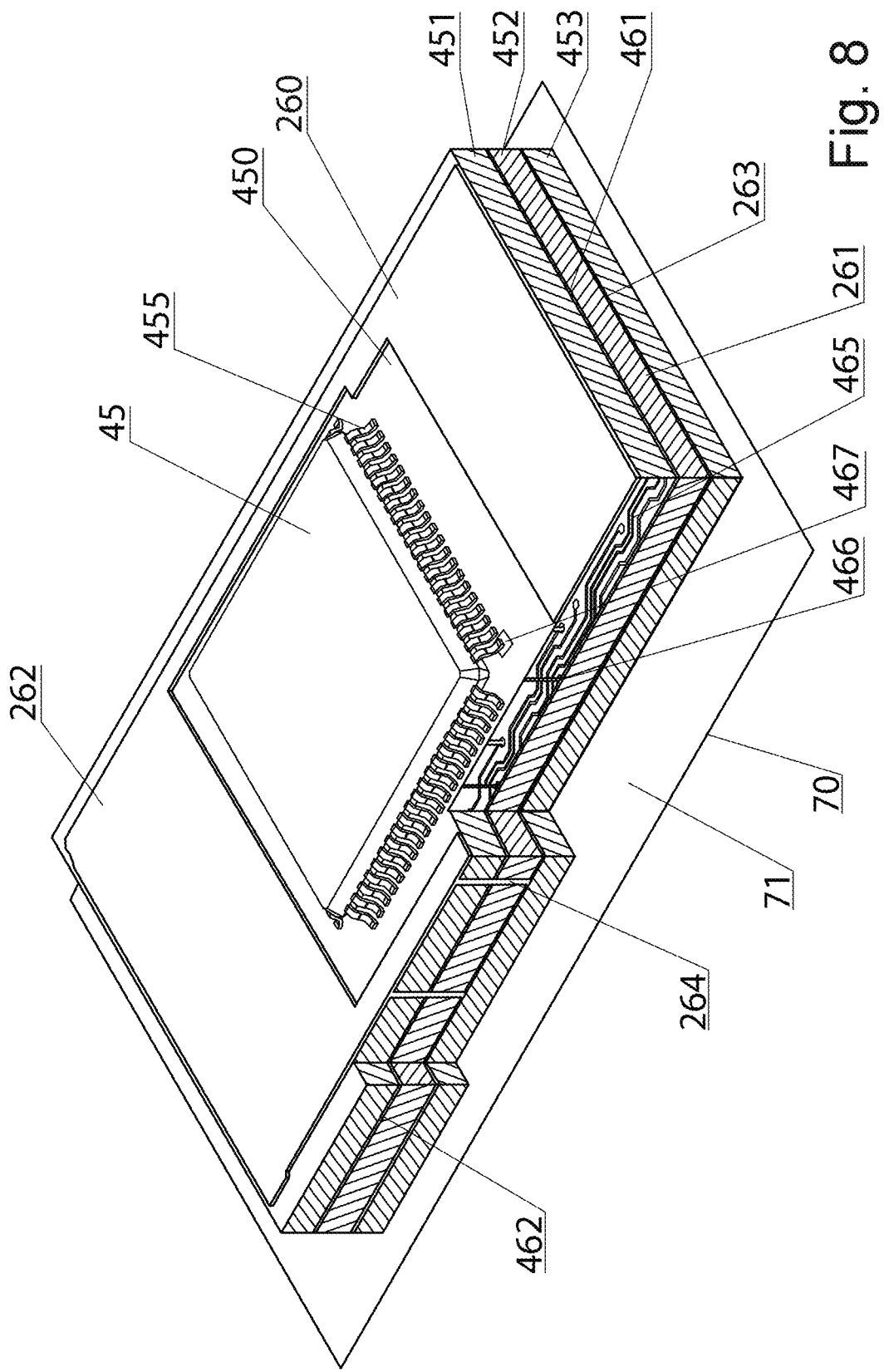
FIG. 8 shows an axonometric view of a part of a PCB with the processor of a control arrangement.
Figure 9:
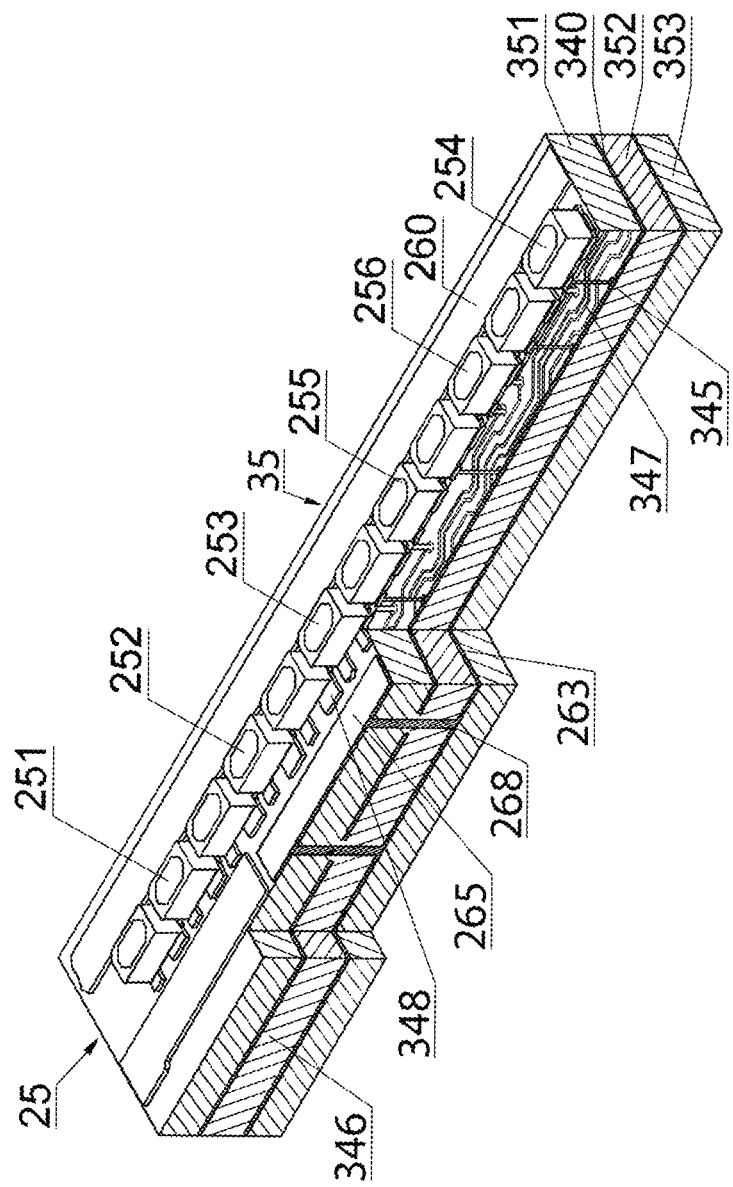
FIG. 9 shows a part of a PCS with LEDs.

FIG. 8 shows an axonometric view of a part of a PCB with a processor 45 of the control arrangement 40, which can be a part of one PCB together with a fragment of a board of FIG. 9. The PCS 450 is attached to a housing 70 or to a structural element of the housing 70 with a contact surface 71, which is in contact with a bottom surface of the PCS 450 or another printed circuit board. The board 450 is a multilayer board and comprises a bottom metal shielding layer 203, which is a part of the board 450 with the processor 45 directed to the contact surface 71 and the housing 70 or the structural element of the housing 70, from which the bottom shielding layer 263 is insulated by means of a bottom insulating layer 453. In addition, the board 450 has at least one additional metal shielding layer 261, for example copper or silver shielding layer, which together with the bottom metal shielding layer 263, for example copper or silver shielding layer, forms the shielding system 260, which further comprises another metal shielding layer 262, for example copper or sliver shielding layer, whose layers are connected using electrical connections 264, also known as grummets. Between the additional metal shielding layer 261 and the bottom metal shielding layer 263, there is at least one inner layer 461, 462 with electrical circuits, insulated from the additional metal shielding layer 261 with a top insulating layer 451 and insulated from the bottom metal shielding layer 263 with a central insulating layer 452. The electrical circuits located in the inner layer 461, 462 have conductive paths 465, which are connected with electronic elements or components, for example resistors, capacitors, diodes, transistors, of devices mounted on the board 450, for example with pins 455 of the processor 45, using additional connections 466, which are connected to connecting boards 467, called pads.

In turn, FIG. 9 shows a fragment of a PCB 35, with the system 25 of LEDs with the segments 251, 252, 253, 254, 255, 256 of LEDs, which comprises the bottom metal shielding layer 263, which faces the contact surface of the housing, from which the bottom shielding layer 263 is insulated by an insulating layer 353. The bottom metal shielding layer 263 is a part of the spatial screen 260, which also comprises at least one additional metal shielding layer 265, whose layers are connected using an electrical connector 268, also known as a grommet, and between which there is at least one inner layer 340, 346 with electrical circuits, which is insulated from the bottom shielding layer 263 using a central insulating layer 352 and from the additional shielding layer 265 using a top insulating layer 351, connecting the LEDs from the segments 251, 252, 253, 254, 255, 256 with the power supply systems and with the LED control systems. The electrical circuits connecting the LEDs have conductive paths 347 made of a conductive metal, for example of copper and/or silver and/or a metal with similar properties, which are connected by loop through joints 345 with connecting boards 348, also called pads, to which are soldered contact plates or leads of LEDs. A voltage waveform 501 over time at an output of a full-wave rectifier and a voltage waveform 502 over time at an output of the six half-wave rectifier are presented in FIG. 10. In this figure, a minimum voltage value in the case of the three-phase $U_{3\_MIN}$, a maximum voltage value the case of the three-phase $U_{3\_MAX}$, an effective voltage value in the case of the three-phase $U_{3\_RM3}$, a maximum voltage value in the case of the one-phase $U_{1\_MAX}$ and an effective voltage value in the case of the one-phase $U_{1\_RMS}$ were presented. In the case of the six half-wave rectifier, the main difference compared to a rectified one-phase voltage is the lack of voltage reduction to zero level. The minimum voltage level which can be achieved equals approximately 480 V at the supply of European energy network 3×400 VAC/50 Hz. On the basis of the voltage shape, two components: a contestant component and a variable component, can be seen. The presence of the constant voltage at a certain level allows for continuous lighting of some of the supplied LEDs. The second path of the rectified voltage is a variable waveform with an amplitude of about 70 V and a frequency of 300 Hz. This is the usable voltage range on which the work dynamics of a sequential control system is built or based. The combination of two features above, namely the lack of voltage reduction below a certain minimum value and the high frequency of the variable component, allows one to obtain a stable luminous flux with no noticeable flickering/flashing of light.

Figure 3:
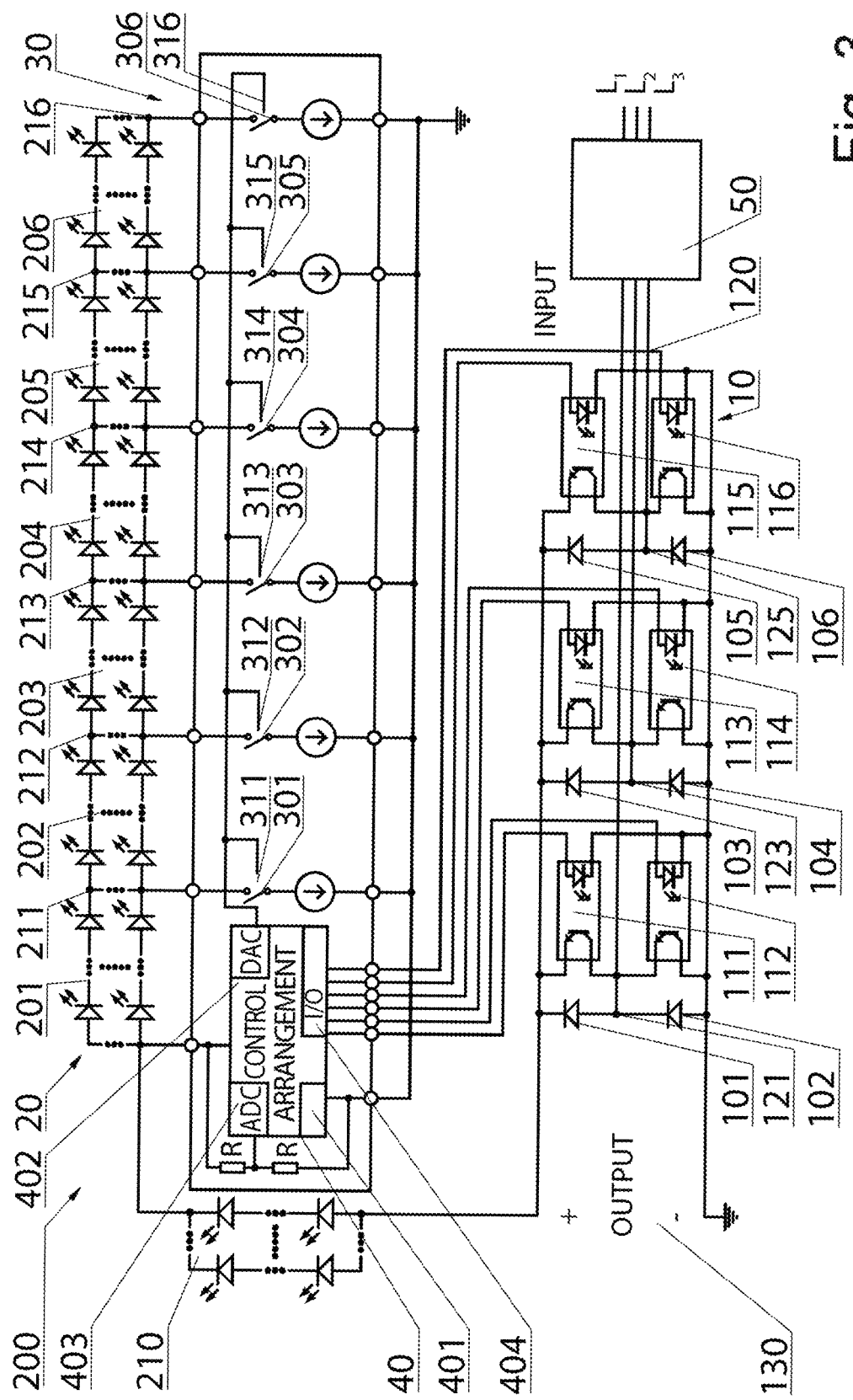
FIG. 3. 4, 5 show LEDs systems with an LED zero passive segment with a three-phase power supply.
Figure 11D:
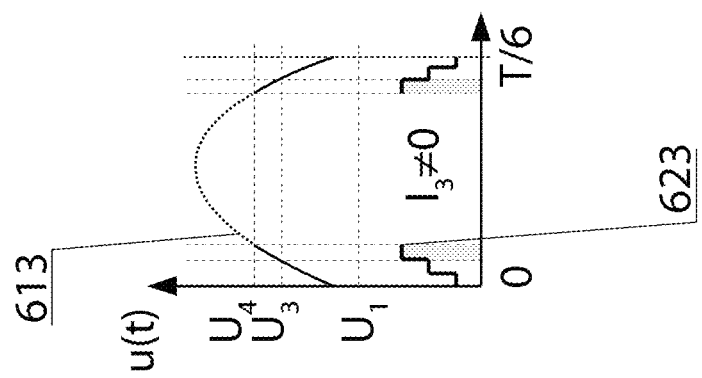
Figure 11C:
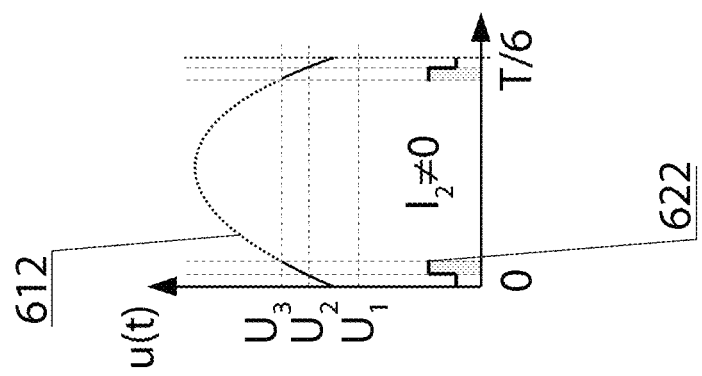
Figure 11B:
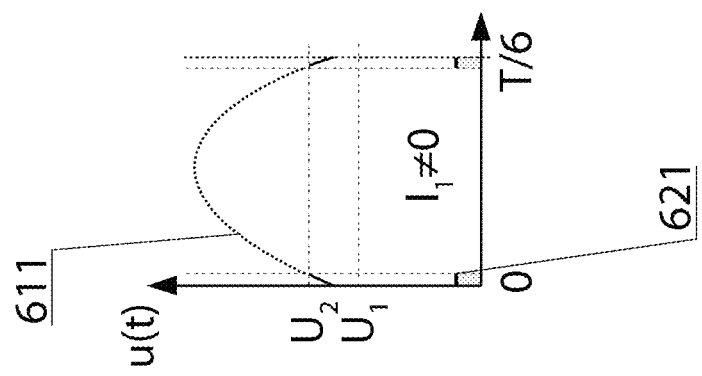
Figure 11A:
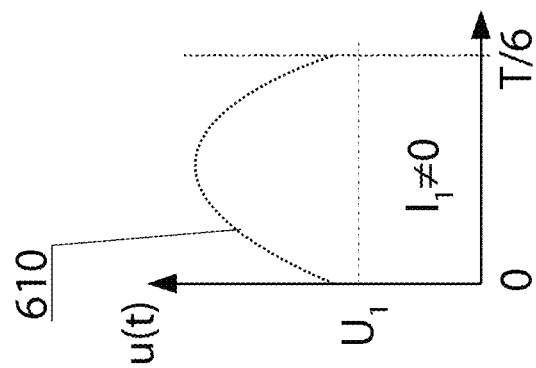

A method of switching on the system shown in FIG. 3 and supplied with the three-phase voltage, and comprising six active segments 201, 202, 203, 204, 205, 200 and one passive segment 210, is presented in FIG. 11A-11H using voltage waveforms 610, 611, 612, 613, 614, 615, 617 and currant waveforms 621, 622, 623, 624, 625, 626, 627. In this figures, a thin line represents the supply voltage waveforms in respective LEDs segments, and a bold line, the waveforms of instantaneous current flowing through all linear current sources. The instantaneous current is at the same time the total current supplying the zero segment 210. Current sources are added sequentially in such a way that only one of them is working at a given moment. The exception is a transitional state between switching off one source and switching on another source, when the current is modulated by a linear function, and two sources can operate simultaneously. The current of each successive source is always larger than the previous one in order to keep the average current value for each segment at a constant level and thereby to compensate for the shorter fighting time of a given segment. The waveforms shown suggest that an activating threshold $U_1$ for the first segment 201 is set with a suitable margin in such a way that the instantaneous value of the supply voltage is always above this threshold, for example 470 V. Thus, the first segment 201 is always supplied by a source $I_1$, while the switching system 301 is switched on and lights continuously, at the same time supplying the zero segment. Till the point where the power supply does not reach a threshold $U_2$, only the first segment 201 and the zero segment 210 light. After crossing the threshold $U_2$, the second segment 202 is appended by activating a source $I_2$ by switching on the switching system 302 and switching off the switching system 301. At that moment, only three segments light. Then, after crossing a threshold $U_2$, the third segment 203 is supplied by switching on a source $I_1$. Then, in the same way, after crossing successive voltage thresholds, successive segments are added until the voltage exceeds a threshold $U_3$. After the last segment 206 is switched on, there is still a certain voltage margin to the maximum value, also called a peak value, which is accumulated on active control means, thereby converting or transforming the excessive power directly into Joule's heat. The chart in FIG. 11H shows a summary shape in a form of rectangles 601, 602, 603, 604, 605, 606 of the current supplying all the segments of LEDs obtained by summing the instantaneous currents 621, 622, 623, 624, 625, 626, 627 for all sources from $I_1$ to $I_6$. The use of zero segment 210 and an appropriate selection of the switching thresholds of individual segments and also their quantity allows for obtaining the optimal operation of the system at minimum power losses. The excess of power is also deposited in the active elements in transitional moments between successive working thresholds. Thereby, increasing the number of active segments has a beneficial impact on reducing total power loss. At the same time, it is possible to better fit the current shape to the shape of the supply voltage, which contributes to a decrease in the level of harmonic distortions emitted by the system to the power grid. Without the use of sequences, all voltage excess would be transformed into heat, while in the sequencer system, the excessive voltage is gradually deposited on successive levels of lighting LEDs, so that the electrical efficiency of the whole system is high.

While the technical concept presented herein has been depicted, described, and has been defined with reference to particular preferred embodiments, such references and examples of implementation in the foregoing specification do not imply any limitation on the concept. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. A three-phase power supply comprising
a three-phase AC power supply;
a three-phase rectifier bridge circuit of six rectifying diodes connected to the three-phase alternating current (AC) power supply and configured to rectify received three phase AC power for generating a ripple direct current (DC) voltage of a DC power supply system, wherein the six diodes form three pairs of two rectifying diodes connected in series at a connection point, one pair of two rectifying diodes associated with one phase of the three-phase AC power supply connected to the connection point, wherein each cathode of one of the two diodes of the three pairs not connected to the connection point is connected to +U pole of the DC power supply system supplying an electronic device and each anode of one of the two diodes of the three pairs not connected to the connection point is connected to −U pole of the DC power supply system supplying the electronic device,
a plurality of rectifying units, wherein one rectifying unit for each phase having one light emitting diode (LED) and one field-effect transistor (FET) having a gate activated by the LED of the rectifying unit and connected in parallel with one rectifying diode of the three-phase rectifier bridge circuit and conductive in the same direction as the rectifying diode bypassed by the FET and switched on by the gate using the LED; and
a control arrangement provided with a microcontroller having outputs and inputs connected to each cathode of one of the two diodes of the three pairs not connected to the connection point, each output of the microcontroller linked to one gate for activating the FET bypassing the rectifying diode through which flows rectified current.

2. The three-phase power supply according to claim 1, wherein the FET is an optoisoiator with a transistor output.

3. The three-phase power supply according to claim 1, further comprising
a main resistive-capacitive (RC) parallel circuit connected to one of +U pole and −U pole and connected to an additional RC parallel circuit at a RC connection point and connected to remaining one of +U pole; and
metal shield layers wherein at least one metal shield layer is connected to the RC connection point.

4. The three-phase power supply according to claim 3, wherein the metal shield layers are copper layers of a printed circuit board of the three-phase power supply.

5. The three-phase power supply according to claim 3, wherein a Zener diode is connected between +U pole and −U pole.

6. The three-phase power supply according to claim 3, wherein the electronic device is an LED system comprising at least two segments of LEDs connected in series wherein each LED connection point connecting two adjacent segments of LEDs is connected to an input side of one switching system activated by a control arrangement controlled by the ripple DC voltage, whereas an output side off the switching system is connected to the −U pole.

7. The three-phase power supply according to claim 6, wherein a zero LED segment is connected between the LED system comprising at least two segments of LEDs and one of the +U pole and the −U pole.

8. The three-phase power supply according to claim 6, wherein the LEDs segments and the zero LED segment comprise at least one LED or a system of at least two diodes connected in parallel and in series.

9. The three-phase power supply according to claim 6, wherein the LEDs segments are arranged on an LED printed circuit board (PCB) with electrical circuits and electronic components.

10. The three-phase power supply according to claim 9, wherein the LED PCB is provided with outer metal layers forming a shield of the electrical circuits and electronic components and at least one inner layer with electrical circuits connecting the electrical circuits and electronic components with the LEDs segments and protecting the electrical circuits and electronic components and the LEDs segments against damages caused by electrostatic discharges.

11. The three-phase power supply according to claim 10, wherein at least one of the outer metal layers is connected to the main RC parallel circuit and another of the outer metal layers metal shielding layer is connected to the additional RC parallel circuit.

12. The three-phase power supply according to claim 10, wherein one of the outer metal layers of the LED PCB is insulated from a contact surface of a housing or housing structural elements.

* * * * *